(12) United States Patent
Xiao et al.

(10) Patent No.: US 12,369,647 B2
(45) Date of Patent: Jul. 29, 2025

(54) METHOD FOR CONTROLLING HEATING MODE OF ATOMIZATION ASSEMBLY AND RELATED DEVICE

(71) Applicant: Shenzhen Smoore Technology Limited, Shenzhen (CN)

(72) Inventors: Feng Xiao, Shenzhen (CN); Huakai Yuan, Shenzhen (CN); Tao Ren, Shenzhen (CN)

(73) Assignee: Shenzhen Smoore Technology Limited, Shenzhen (CN)

( * ) Notice: Subject to any disclaimer, the term of this patent is extended or adjusted under 35 U.S.C. 154(b) by 924 days.

(21) Appl. No.: 17/529,283

(22) Filed: Nov. 18, 2021

(65) Prior Publication Data
US 2022/0151304 A1    May 19, 2022

(30) Foreign Application Priority Data
Nov. 19, 2020   (CN) .......................... 202011301974.5

(51) Int. Cl.
*A24F 40/57*    (2020.01)
*A24F 40/51*    (2020.01)
(Continued)

(52) U.S. Cl.
CPC .............. *A24F 40/57* (2020.01); *A24F 40/51* (2020.01); *A24F 40/53* (2020.01); *G05B 19/4155* (2013.01); *G05B 2219/50333* (2013.01)

(58) Field of Classification Search
CPC ........... A24F 40/51; A24F 40/57; A24F 40/53
See application file for complete search history.

(56) References Cited

U.S. PATENT DOCUMENTS 11,633,554 B1 * 4/2023 Puviani .............. A61K 31/4045
128/200.14
2018/0195229 A1   7/2018 Pistochini et al.
(Continued)

FOREIGN PATENT DOCUMENTS

CN    108851232 A    11/2018
CN    109998178 A    7/2019
(Continued)

OTHER PUBLICATIONS

Canada Office Action, Canada Application No. 3,139,364, mailed Jan. 13, 2023 (6 pages).
(Continued)

*Primary Examiner* — Marcus E Harcum (57) ABSTRACT

Disclosed are a method for controlling a heating mode of an atomization assembly and a related device. The method includes: obtaining a first temperature at a first predetermined position of the atomization assembly via a first temperature collector; wherein the first predetermined position is a position of an outlet of the atomization assembly; obtaining a temperature difference between the first temperature and a second temperature via a controller; wherein the second temperature is a temperature at a second predetermined position of the atomization device; comparing the temperature difference with a predetermined temperature difference, and determining a heating state of an aerosol-forming substrate in the atomization assembly; wherein the heating mode comprises completed atomization and uncompleted atomization; and controlling the heating mode according to the heating state by changing the heating mode to a non-heating mode in response to the heating state being the completed atomization.

20 Claims, 3 Drawing Sheets

(51) Int. Cl.
*A24F 40/53* (2020.01)
*G05B 19/4155* (2006.01)

(56) References Cited

U.S. PATENT DOCUMENTS

| | | | | |
|---|---|---|---|---|
| 2020/0367570 | A1* | 11/2020 | Batista | A24F 40/57 |
| 2021/0007393 | A1* | 1/2021 | Jung | A24F 40/20 |
| 2021/0007409 | A1* | 1/2021 | Nakano | A24F 40/50 |
| 2021/0076743 | A1* | 3/2021 | Gill | A61M 11/042 |
| 2021/0145072 | A1* | 5/2021 | Mullin | A24F 40/57 |
| 2021/0169148 | A1* | 6/2021 | Nakano | A24F 40/53 |
| 2021/0177063 | A1* | 6/2021 | Mizuguchi | A24F 40/57 |
| 2021/0195961 | A1* | 7/2021 | Marubashi | H02J 7/0063 |
| 2021/0235770 | A1* | 8/2021 | Uthurry | A24F 40/57 |
| 2021/0274849 | A1* | 9/2021 | Marubashi | A61M 15/0063 |
| 2021/0307406 | A1* | 10/2021 | Marubashi | G05B 15/02 |
| 2021/0308388 | A1* | 10/2021 | Vosen | A24F 40/51 |
| 2021/0392957 | A1* | 12/2021 | Leadley | A24F 40/53 |
| 2022/0015451 | A1* | 1/2022 | Walker | G05D 23/1909 |
| 2022/0095687 | A1* | 3/2022 | Fujinaga | A24F 40/53 |
| 2022/0232893 | A1* | 7/2022 | Jaeger | H05B 3/04 |
| 2022/0408840 | A1* | 12/2022 | Adair | A24F 40/485 |
| 2023/0017816 | A1* | 1/2023 | Jung | A24F 40/53 |
| 2023/0096771 | A1* | 3/2023 | Garcia Garcia | A24F 40/57 131/329 |
| 2023/0102855 | A1* | 3/2023 | Fujita | A24F 40/46 131/329 |

FOREIGN PATENT DOCUMENTS

| | | |
|---|---|---|
| CN | 111407003 A | 7/2020 |
| CN | 214257971 U | 9/2021 |
| EP | 3574779 A2 | 12/2019 |
| WO | 2017185355 A1 | 11/2017 |
| WO | 2019138043 A1 | 7/2019 |
| WO | 2020086883 A1 | 4/2020 |
| WO | 2020223941 A1 | 11/2020 |

OTHER PUBLICATIONS

Chinese First Office Action, Chinese Application No. 202011301974.5, mailed Dec. 25, 2024 (19 pages).
Chinese Notification to Grant Patent Right for Invention, Chinese Application No. 202011301974.5, mailed Jan. 14, 2025 (5 pages).

* cited by examiner

```
┌─────────────────────────────────────────────────────────────┐
│ obtaining a first temperature at a first predetermined position of the │──S11
│    atomization assembly via a first temperature collector            │
└─────────────────────────────────────────────────────────────┘
                               │
                               ▼
┌─────────────────────────────────────────────────────────────┐
│ obtaining a temperature difference between the first temperature and │──S12
│              a second temperature via a controller                   │
└─────────────────────────────────────────────────────────────┘
                               │
                               ▼
┌─────────────────────────────────────────────────────────────┐
│    comparing the temperature difference with a predetermined        │──S13
│   temperature difference and obtaining a comparison result, and     │
│  determining a heating state of an aerosol-forming substrate in the │
│      atomization assembly according to the comparison result        │
└─────────────────────────────────────────────────────────────┘
                               │
                               ▼
┌─────────────────────────────────────────────────────────────┐
│      controlling a heating mode according to the heating state of the │──S14
│  aerosol-forming substrate in the atomization assembly to control the │
│    heating mode to a non-heating mode in response to the heating state │
│                      being completed heating                          │
└─────────────────────────────────────────────────────────────┘
```

METHOD FOR CONTROLLING HEATING MODE OF ATOMIZATION ASSEMBLY AND RELATED DEVICE

CROSS REFERENCE

The present application claims foreign priority of Chinese Patent Application No. 202011301974.5, filed on Nov. 19, 2020, in the China National Intellectual Property Administration, the entire contents of which are hereby incorporated by reference in its entirety.

TECHNICAL FIELD

The present disclosure relates to the field of electronic atomization device technologies, and in particular to a method for controlling a heating mode of an atomization assembly and a related device.

BACKGROUND

As a substitute for conventional cigarettes, electronic cigarettes, such as heat-not-burn (HNB) smoking device, are gaining more and more attention and popularity because they are safe to use, convenient, healthy, and environmentally friendly.

Currently, a heat-not-burn (HNB) smoking device generally includes an atomization assembly and a power supply assembly. The atomization assembly is configured to heat and atomize an aerosol-forming substrate when energized, and the power supply assembly is configured to supply power to the atomization assembly. Specifically, the atomization assembly generally includes an atomization chamber and a heating element. The atomization chamber is configured to hold the aerosol-forming substrate, and the heating element is configured to heat and atomize the aerosol-forming substrate when energized, thereby generating smoke to be inhaled by a user. Specifically, in a heating process of the aerosol-forming substrate in the atomization chamber, it is generally determined by the user's taste whether the aerosol-forming substrate has been completely heated, i.e., whether all of an active ingredient in the aerosol-forming substrate has been completely baked. The heating of the aerosol-forming substrate by the heating element is terminated after complete baking.

However, determining the current heating state of the aerosol-forming substrate by the user's taste may not only cause the user to inhale a burnt smell, which may damage the user's health, but also greatly reduce the amount of smoke that the user can inhale, making the user experience poor.

SUMMARY OF THE DISCLOSURE

A technical solution adopted by the present disclosure is to provide a method for controlling a heating mode of an atomization assembly, comprising: obtaining a first temperature at a first predetermined position of the atomization assembly via a first temperature collector; wherein the first predetermined position is a position around an outlet of the atomization assembly; obtaining a temperature difference between the first temperature and a second temperature via a controller; wherein the second temperature is a temperature at a second predetermined position of the atomization assembly; comparing the temperature difference with a predetermined temperature difference and obtaining a comparison result, and determining a consumption state of an aerosol-forming substrate in the atomization assembly according to the comparison result; wherein the heating mode comprises completed atomization and uncompleted atomization; and controlling the heating mode according to the consumption state of the aerosol-forming substrate in the atomization assembly by changing the heating mode to a non-heating mode in response to the consumption state being the completed atomization.

In some embodiments, before the obtaining the temperature difference between the first temperature and the second temperature via the controller, the method further comprises: obtaining the second temperature at the second predetermined position of the atomization assembly via a second temperature collector; wherein the second temperature collector is arranged at the second predetermined position of the atomization assembly, and the second predetermined position is different from the first predetermined position.

In some embodiments, before the obtaining the temperature difference between the first temperature and the second temperature via the controller, the method further comprises: obtaining a specific heat capacity, a mass, and current heat data of the atomization assembly via the controller; and obtaining the second temperature according to the specific heat capacity, the mass, and the current heat data of the atomization assembly.

In some embodiments, the determining the consumption state of the aerosol-forming substrate in the atomization assembly according to the comparison result comprises: in response to the temperature difference being greater than the predetermined temperature difference, determining the consumption state of the aerosol-forming substrate in the atomization assembly to be the uncompleted atomization; and in response to the temperature difference being less than or equal to the predetermined temperature difference, determining the consumption state of the aerosol-forming substrate in the atomization assembly to be the completed atomization, and outputting a control signal; wherein the control signal comprises at least one of a power-off signal and a prompt signal to remind a user.

In some embodiments, the controlling the heating mode according to the consumption state of the aerosol-forming substrate in the atomization assembly by changing the heating mode to the non-heating mode in response to the consumption state being the completed atomization comprise: in response to the consumption state of the aerosol-forming substrate in the atomization assembly being the completed atomization, changing the heating mode to be the non-heating mode according to the control signal; in response to the consumption state of the aerosol-forming substrate in the atomization assembly being the uncompleted atomization, obtaining a different between the temperature difference and the predetermined temperature difference; determining a theoretical electric power value of the atomization assembly according to the difference; and adjusting a current electric power value of the atomization assembly according to the theoretical electric power value; wherein the difference and the theoretical electric power value have a one-to-one correspondence relationship.

In some embodiments, after the obtaining the difference between the temperature difference and the predetermined temperature difference in response to the consumption state of the aerosol-forming substrate in the atomization assembly being the uncompleted atomization, the method further comprises: determining the number of remaining inhaling times of the atomization assembly according to the difference; wherein the difference and the number of remaining inhaling times have a one-to-one correspondence relationship.

In some embodiments, the second predetermined position is a position close to a heating element of the atomization assembly.

Another technical solution adopted by the present disclosure is to provide an atomization assembly, comprising: an atomization chamber, defining an inlet and an outlet and configured to accommodate an aerosol-forming substrate; a heat generating element, configured to heat and atomize the aerosol-forming substrate when the heat generating element is energized; a first temperature collector, arranged at a first predetermined position of the atomization chamber, and configured to obtain a first temperature at the first predetermined position of the atomization chamber; wherein the first predetermined position is a position around the outlet of the atomization chamber; and a controller, connected to the first temperature collector and configured to: obtain a temperature difference between the first temperature and a second temperature; compare the temperature difference with a predetermined temperature difference and obtaining a comparison result, and determine a consumption state of an aerosol-forming substrate in the atomization assembly according to the comparison result; wherein the second temperature is a temperature at a second predetermined position of the atomization chamber, and the consumption state comprises completed atomization and uncompleted atomization; and control the heating mode according to the consumption state of the aerosol-forming substrate in the atomization assembly by changing the heating mode to a non-heating mode in response to the consumption state being the completed atomization.

In some embodiments, the atomization assembly further comprises a second temperature collector connected to the controller; wherein the second temperature collector is arranged at the second predetermined position of the atomization chamber; the second temperature collector is configured to obtain the second temperature and send the second temperature to the controller; the second predetermined position is different from the first predetermined position.

In some embodiments, the controller is further configured to obtain a specific heat capacity, a mass, and current heat data of the atomization assembly via the controller; and obtain the second temperature according to the specific heat capacity, the mass, and the current heat data of the atomization assembly.

In some embodiments, the controller is further configured to: in response to the temperature difference being greater than the predetermined temperature difference, determine the consumption state of the aerosol-forming substrate in the atomization assembly to be the uncompleted atomization; and in response to the temperature difference being less than or equal to the predetermined temperature difference, determine the consumption state of the aerosol-forming substrate in the atomization assembly to be the completed atomization, and output a control signal; wherein the control signal comprises at least one of a power-off signal and a prompt signal to remind a user.

In some embodiments, the controller is further configured to: in response to the consumption state of the aerosol-forming substrate in the atomization assembly being the completed atomization, change the heating mode to be the non-heating mode according to the control signal; in response to the consumption state of the aerosol-forming substrate in the atomization assembly being the uncompleted atomization, obtain a different between the temperature difference and the predetermined temperature difference; determine a theoretical electric power value of the atomization assembly according to the difference; and adjust a current electric power value of the atomization assembly according to the theoretical electric power value; wherein the difference and the theoretical electric power value have a one-to-one correspondence relationship.

In some embodiments, the controller is further configured to determine the number of remaining inhaling times of the atomization assembly according to the difference; wherein the difference and the number of remaining inhaling times have a one-to-one correspondence relationship.

In some embodiments, the second predetermined position is a position close to a heating element of the atomization assembly.

Another technical solution adopted by the present disclosure is to provide an electronic atomization device, comprising: an atomization assembly as described above; and a power supply assembly, connected to the atomization assembly and configured to supply power to the atomization assembly.

DETAILED DESCRIPTION

The technical solutions in the embodiments of the present disclosure will be clearly and completely described below in conjunction with the accompanying drawings in the embodiments of the present disclosure. It is clear that the embodiments described are only a part of the embodiments of the present disclosure, and not all of them. Based on the embodiments in the present disclosure, other embodiments obtained by those skilled in the art without creative work fall within the scope of the present disclosure.

The terms "first", "second", and "third" in the present disclosure are intended for descriptive purposes only and are not to be construed as indicating or implying relative importance or implicitly specifying the number of indicated technical features. Thus, a feature qualified with "first", "second", or "third" may either explicitly or implicitly indicate that at least one such feature is included. In the description of the present disclosure, "plurality" means at least two, e.g., two, three, etc., unless otherwise expressly and specifically limited. All directional indications (e.g., up, down, left, right, forward, backward, . . . ) in the present disclosure are intended only to explain the relative position relationship, movement, etc., between assemblies in a particular posture (as shown in the accompanying drawings). When the particular posture is changed, the directional indications are changed accordingly. In addition, the terms "include" and "have" and any variations thereof are intended to cover non-exclusive inclusion. For example, a process, method, system, product, or apparatus including a series of steps or units is not limited to the listed steps or units, but optionally also includes steps or units not listed, or optionally also includes other steps or units inherent to the process, method, product, or apparatus.

References herein to "embodiments" mean that particular features, structures, or characteristics described in connection with an embodiment may be included in at least one embodiment of the present disclosure. The presence of the phrase at various points in the specification does not necessarily mean a same embodiment, nor is it a separate or alternative embodiment that is mutually exclusive with other embodiments. It is understood, both explicitly and implicitly, by those skilled in the art that the embodiments described herein may be combined with other embodiments.

The present application is described in detail below in conjunction with the accompanying drawings and embodiments.

Figure 1:
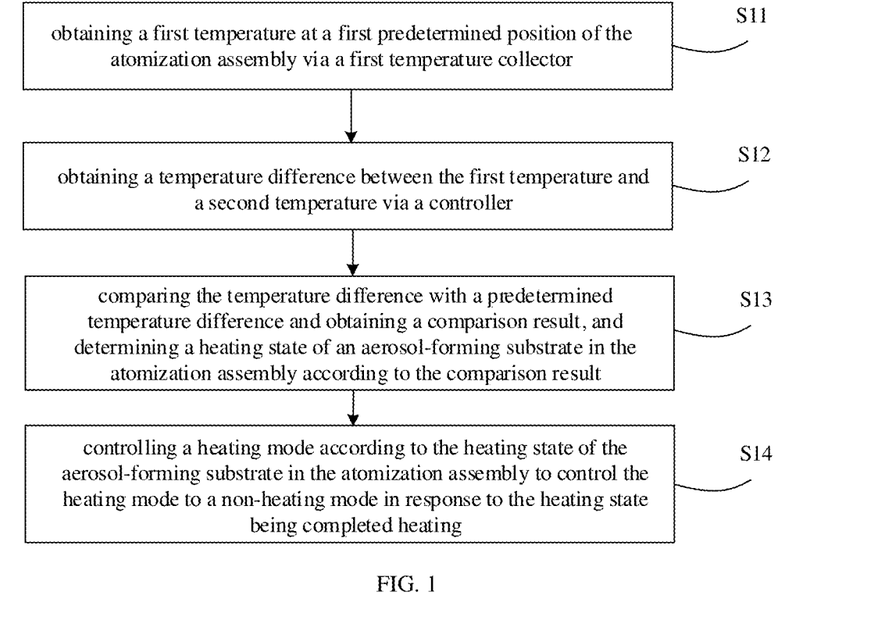
FIG. 1 is a flowchart of a method for controlling a heating mode of an atomization assembly according to an embodiment of the present disclosure.

FIG. 1 is a flowchart of a method for controlling a heating mode of an atomization assembly according to an embodiment of the present disclosure. In the embodiment, a method for controlling a heating mode of an atomization assembly is provided. The method can determine whether an aerosol-forming substrate in the atomization assembly is baked completely in a timely manner and terminate a heating process in a timely manner, thereby preventing the user from continuing to inhale after the aerosol-forming substrate is baked completely and a subsequent problem of inhaling a burnt smell. Moreover, it can be ensured that the user inhales a sufficient amount of smoke each time. In this way, the user experience may be improved.

Specifically, the method includes operations at blocks illustrated in FIG. 1.

At block S11: obtaining a first temperature at a first predetermined position of the atomization assembly via a first temperature collector.

FIG. 2 is a structural schematic view of an atomization assembly according to an embodiment of the present disclosure. In the embodiment, the atomization assembly 10 includes an atomization chamber 11 and a heat generating element (not shown). The atomization chamber 11 defines an atomization cavity 111 configured to accommodate an aerosol-forming substrate. The atomization chamber 11 further defines an inlet 112 and an outlet 113. The inlet 112 and the outlet 113 of the atomization chamber 11 correspond to two ends of the atomization cavity 111 respectively, such that outside air can flow through the atomization cavity 111 via the inlet 112 and then flow out through the outlet 113. In a specific embodiment, the inlet 112 of the atomization chamber 11 is defined at a bottom wall 114 of the atomization chamber 11 and the outlet 113 is defined at a top wall 115 of the atomization chamber 11. The heat generating element is configured to heat and atomize the aerosol-forming substrate when energized. In a specific embodiment, the heating may be achieved by a cavity wall of the atomization chamber 11 and/or by airflow flowing through the atomization cavity 111.

The first predetermined position of the atomization assembly 10 specifically corresponds to a position of the outlet 113 of the atomization assembly 10, i.e., the first temperature collector 12 is configured to collect the temperature at the position of the outlet 113 of the atomization assembly 10. The first temperature collector 12 may specifically be a temperature sensor. In a specific embodiment, the temperature sensor may specifically be arranged at the first predetermined position of the atomization assembly 10 to sense and collect the first temperature at the first predetermined position.

In a specific embodiment, the first temperature may be a real time temperature after a certain time of heating. That is, the heating state of the aerosol-forming substrate in the atomization assembly 10 is not determined during an initial heating, nor is the heating mode of the atomization assembly 10 controlled, thereby reducing a stress for a program to run.

At block S12: obtaining a temperature difference between the first temperature and a second temperature via a controller.

Before the step 12, the method may further include: obtaining the second temperature, the second temperature being specifically the temperature at a second predetermined position of the atomization assembly 10. The first temperature and the second temperature are specifically the temperatures of the first predetermined position and the second predetermined position of the atomization assembly 10 at the same moment.

In a specific embodiment, as shown in FIG. 3, which is a schematic view of positions of a first temperature collector and a second temperature collector on an atomization chamber according to an embodiment of the present disclosure, and in FIG. 4, which is a schematic view of positions of a first temperature collector and a second temperature collector on an atomization chamber according to another embodiment of the present disclosure. The second temperature collector 13 may be configured to obtain the second temperature at the second predetermined position of the atomization assembly 10. The second temperature collector 13 may be specifically a temperature sensor and may be arranged at the second predetermined position of the atomization assembly 10 for sensing and collecting the second temperature at the second predetermined position of the atomization assembly 10. The second predetermined position may be a position close to a heating device. In a specific embodiment, the second predetermined position may be a position of the inlet 112 of the atomization assembly 10 (as shown in FIG. 3) or other positions distinct from the inlet 112 and the outlet 113. For example, the second predetermined position may be at a side wall 116 of the atomization chamber 11. In this embodiment, the second temperature collector 13 may be specifically arranged on the side wall 116 of the atomization chamber 11 and near the bottom wall 114 (as shown in FIG. 4). The heating device is configured to heat and atomize the aerosol-forming substrate when energized. Specifically, the heating device may be the heat generating element.

In another specific embodiment, specific heat capacity, mass, and current heat data of the atomization assembly 10 may be obtained through the controller (not shown), and then the second temperature may be calculated based on the specific heat capacity, mass, and current heat data of the atomization assembly 10. Specifically, the second temperature may be calculated based on a specific heat capacity formula. The specific heat capacity formula is specifically as follows.

$$c = \frac{Q}{m(t - t_0)}$$

where c is the specific heat capacity of the atomization chamber 11, m is the mass of the atomization chamber 11, Q is the heat, t is a final temperature of the atomization chamber 11, and to is an initial temperature of the atomization chamber 11.

Specifically, after pre-heating the atomization chamber 11 with a power P for a duration of time T, the temperature difference before and after heating the atomization chamber 11 is obtained. Then the current specific heat capacity c corresponding to the atomization chamber 11 is obtained according to a formula Q=P·T and the above specific heat capacity formula. It can be understood that in a specific implementation, the value of specific heat capacity c, the mass m of the atomization chamber 11 and the initial temperature $t_0$ of the atomization chamber 11 are known data. Therefore, it is only necessary to record the heating time T, and the heat Q can be obtained by calculating according to the current heating power P. Then the heat Q is brought into the specific heat capacity formula, and the temperature t can be obtained. The temperature t is the second temperature.

The temperature difference between the first temperature and the second temperature specifically refers to the difference between the first temperature and the second temperature obtained at the current moment. For example, at a moment $T_1$, the obtained first temperature is $t_1$ and the second temperature is $t_2$. In this case, the temperature difference between the two is $t_1-t_2$.

At block S13: comparing the temperature difference with a predetermined temperature difference and obtaining a comparison result, and determining a heating state of an aerosol-forming substrate in the atomization assembly according to the comparison result.

The heating state may include completed heating and uncompleted heating. In a specific implementation, the step S13 includes: determining whether the temperature difference is greater than the predetermined temperature difference; in response to the temperature difference being greater than the predetermined temperature difference, determining the heating state of the aerosol-forming substrate in the atomization assembly 10 to be uncompleted heating; and in response to the temperature difference being not greater than the predetermined temperature difference, i.e., in response to the temperature difference being less than or equal to the predetermined temperature difference, determining the heating state of the aerosol-forming substrate in the atomization assembly 10 to be completed heating. In a specific embodiment, when the heating state is determined to be completed heating, a control signal is output through the controller. The control signal may include a power-off signal to disconnect an electrical connection of the atomization assembly 10, for terminating the heating process. Of course, in other embodiments, the control signal may further include a prompt signal to remind the user that an active ingredient in the aerosol-forming substrate has currently been baked completely, such that the user can make corresponding actions in time, for example, to stop inhaling in time to prevent inhaling a burnt smell. The prompt signal may be one or more of an acoustic-and-optical prompt, a vibration prompt and a voice prompt. It can be understood that the heating state may refer to a consumption state; and the completed/uncompleted heating may refer to a completed/uncompleted atomization state, indicating whether the aerosol-forming substrate in the atomization assembly 10 has been completely atomized or consumpt.

The predetermined temperature difference may be in a range of [3, 10]. It should be noted that during the heating process of the atomization assembly 10, as the heating time is extended, the temperature difference between the inlet 112 and the outlet 113 of the atomization chamber 11 becomes less and finally tends to be zero. That is, after the active ingredient in the aerosol-forming substrate is completely baked, the first temperature and the second temperature converge to the same.

At block S14: controlling a heating mode according to the heating state of the aerosol-forming substrate in the atomization assembly to control the heating mode to a non-heating mode in response to the heating state being completed heating.

In a specific embodiment, as shown in FIG. 4, the step S14 specifically includes: controlling the current heating mode to a non-heating mode according to the control signal in response to the heating state of the aerosol-forming substrate in the atomization assembly 10 being completed heating, such that the heating can be terminated in time after the aerosol-forming substrate is completely baked, to prevent the problem of the user continuing to inhale and inhaling a burnt smell after the aerosol-forming substrate is completely baked. Moreover, it can be ensured that the user inhales a sufficient amount of smoke each time. In this way, the user experience may be improved.

In response to the heating state of the atomization assembly 10 being uncompleted heating, the method may further include: obtaining a difference between the temperature difference and the predetermined temperature difference through the controller, determining a theoretical electric power value of the atomization assembly 10 according to the difference, and adjusting a current electric power value of the atomization assembly 10 according to the theoretical electric power value. That is, the current electric power value is adjusted to the corresponding theoretical electric power value to control the heating power at any time, thereby preventing overheating and scorching the aerosol-forming substrate, and preventing the problem of scalding the user due to too high heating power in the late stage of heating. It should be noted that each difference value corresponds to a theoretical electric power value, and the correspondence can be predetermined according to the actual situation. For example, when the difference value is 50, the corresponding theoretical electric power value may be 200 watts, and the current heating electric power value may be adjusted to 200 watts. When the difference value is 30, the corresponding theoretical electric power value is 150 watts, and the current heating electric power value may be adjusted to 150 watts.

Further, in a specific embodiment, after the obtaining the difference between the temperature difference and the predetermined temperature difference in response to the heating state of the atomization assembly 10 being uncompleted heating, the controller may be further configured to determine the number of remaining inhaling times of the atomization assembly 10 according to the difference, and reminding the user of a current number of remaining inhaling times of the atomization assembly 10 by voice broadcast or vibration times, such that the user can choose the number of times to continue inhaling according to the number of remaining inhaling times, so as to prevent the problem of the user inhaling a burnt smell or a low amount of smoke in the late stage of inhaling. It can be understood that each difference corresponds to a number value of remaining inhaling times of the atomization module 10, and the correspondence can be predetermined according to the actual situation. For example, when the difference is 50, the corresponding number of remaining inhaling times may be 50; when the difference is 30, the corresponding number of remaining inhaling times may be 30. The remaining inhaling times herein refer to inhaling times of a remaining aerosol-forming substrate.

In the method for controlling the heating mode of the atomization assembly provided in the embodiments, a first temperature at a first predetermined position of the atomization assembly 10 is obtained through a first temperature collector 12; a temperature difference between the first temperature and a second temperature is compared with a predetermined temperature difference through a controller to determine the heating state of the aerosol-forming substrate in the atomization assembly 10; the heating state of the aerosol-forming substrate in the atomization assembly 10 is determined through the controller; controlling the heating mode of the aerosol-forming substrate in the atomization assembly 10 by the controller according to the heating state of the aerosol-forming substrate in the atomization assembly 10, such that the heating of the aerosol-forming substrate in the atomization assembly 10 is terminated by controlling the heating mode to a non-heating mode when the heating state is completed heating. Compared with the prior art in which the heating is terminated based on a determination of the user's taste, in the present disclosure, the heating can be terminated in time after the aerosol-forming substrate is baked, thereby preventing the problem of the user continuing to inhale and inhaling a burnt smell after the aerosol forming substrate is completely baked, and ensuring that the user inhales a sufficient amount of smoke each time to improve the user experience. Moreover, the first temperature collector 12 collects the temperature at the position of the outlet 113 of the atomization assembly 10, and the second temperature is a temperature at a position other than the outlet 113 of the atomization assembly 10. By comparing the temperature at the position of the outlet 113 of the atomization assembly 10 with the temperature at the other position, the heating state of the aerosol-forming substrate in the atomization assembly 10 may be determined, such that the accuracy of determining the heating state of the aerosol-forming substrate in the atomization assembly 10 can be greatly improved.

Figure 2:
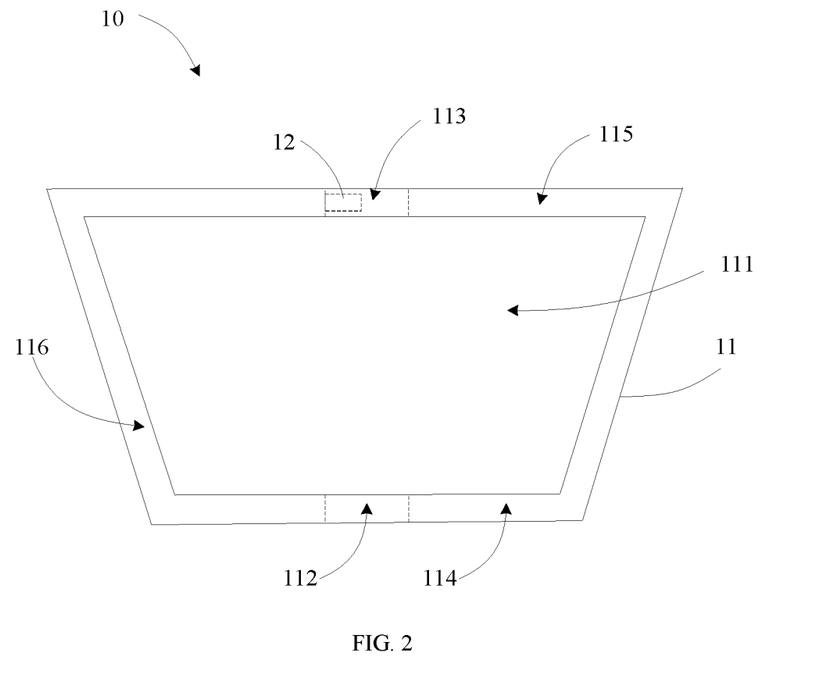
FIG. 2 is a structural schematic view of an atomization assembly according to an embodiment of the present disclosure.

Referring further to FIG. 2, in the embodiment, an atomization assembly 10 is provided, which is configured to heat and atomize an aerosol-forming substrate accommodated in the atomization assembly 10 when energized, thereby generating smoke to be inhaled by a user. The aerosol-forming substrate may be specifically tobacco and the atomization assembly 10 may be specifically applied in an electronic cigarette device. Specifically, the atomization assembly 10 includes an atomization chamber 11, a heat generating element (not shown), a first temperature collector 12, and a controller (not shown).

In particular, the atomization chamber 11 defines an atomization cavity 111, configured to accommodate an aerosol-forming substrate. The atomization chamber 11 further defines an inlet 112 and an outlet 113. The inlet 112 and the outlet 113 of the atomization chamber 11 correspond to two ends of the atomization cavity 111 respectively, such that outside air can flow through the atomization cavity 111 via the inlet 112 and then flow out through the outlet 113. In a specific embodiment, the inlet 112 of the atomization chamber 11 is defined at a bottom wall 114 of the atomization chamber 11 and the outlet 113 is defined at a top wall 115 of the atomization chamber 11.

The heat generating element is configured to heat and atomize the aerosol-forming substrate when energized. In a specific embodiment, the heating may be achieved by a cavity wall of the atomization chamber 11 and/or by airflow flowing. Specifically, the heat generating element may be a heating film.

The first temperature collector 12 is arranged at a first predetermined position of the atomization chamber 11 for obtaining a first temperature at the first predetermined position of the atomization chamber 11. The first predetermined position corresponds to a position of the outlet 113 of the atomization chamber 11. Specifically, the first temperature collector 12 may be a temperature sensor, and the operating principle of the temperature sensor includes, but is not limited to, thermocouple, NTC, PT1000, and other means.

The controller is connected to the first temperature collector 12 for obtaining a temperature difference between the first temperature and a second temperature; comparing the temperature difference with a predetermined temperature difference and obtaining a comparison result, and determining a heating state of an aerosol-forming substrate in the atomization assembly 10 according to the comparison result. The second temperature is the temperature at a second predetermined position of the atomization chamber 11. The heating state includes completed heating and uncompleted heating.

Figure 3:
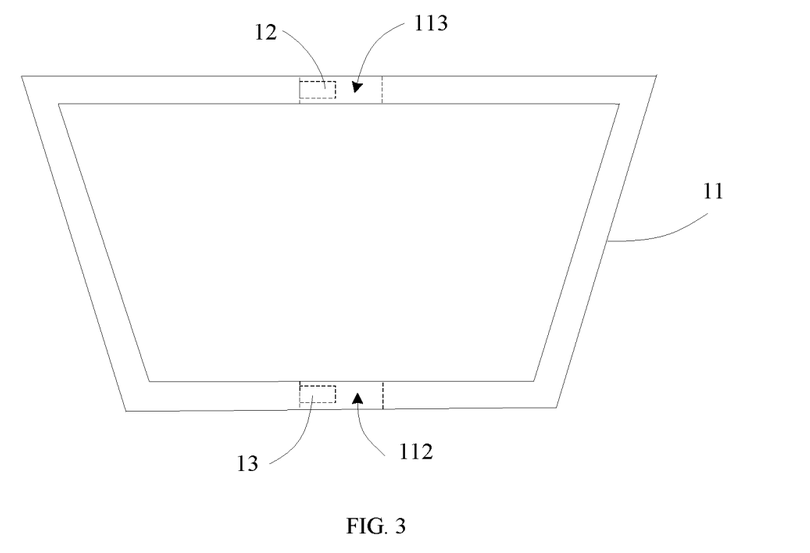
FIG. 3 is a schematic view of positions of a first temperature collector and a second temperature collector on an atomization chamber according to an embodiment of the present disclosure.
Figure 4:
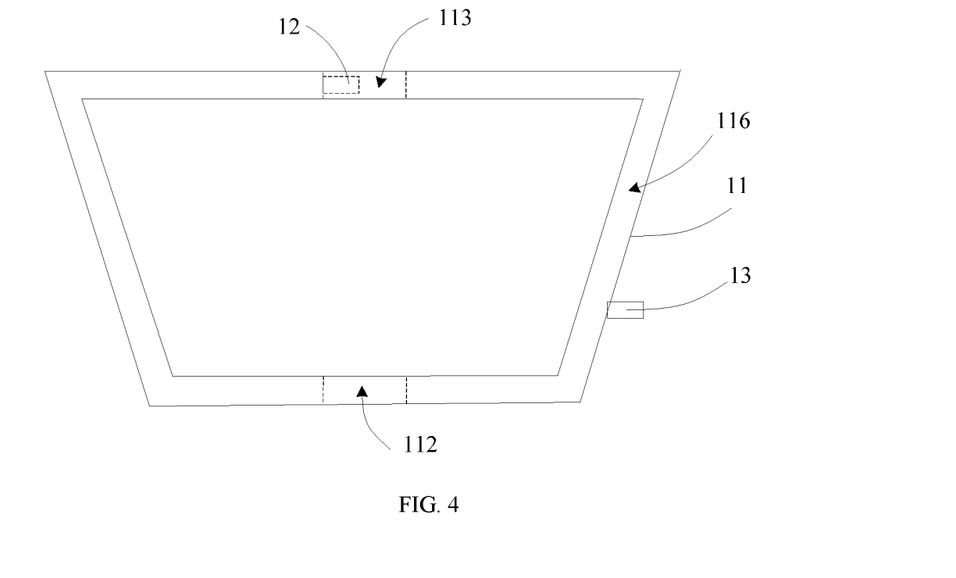
FIG. 4 is a schematic view of positions of a first temperature collector and a second temperature collector on an atomization chamber according to another embodiment of the present disclosure.

In a specific embodiment, as shown in FIGS. 3 and 4, the atomization assembly 10 further includes a second temperature collector 13 connected to the controller. The second temperature collector 13 is arranged at the second predetermined position of the atomization chamber 11 and may be configured to obtain the second temperature and send the second temperature to the controller. The second predetermined position is different from the first predetermined position, and the second predetermined position may be a position close to the heat generating element. In a specific embodiment, the second predetermined position may be specifically a position of the inlet 112 of the atomization chamber 11 or another position distinct from the inlet 112 and the outlet 113.

In another specific embodiment, the controller is further configured to obtain specific heat capacity, mass and current heat data of the atomization chamber 11 and calculate the second temperature based on the specific heat capacity, mass and current heat data of the atomization chamber 11. The specific calculation can be found in the relevant textual descriptions involved in the above embodiments, which will not be repeated herein.

Further, the controller is configured to determine whether the temperature difference is greater than a predetermined temperature difference; in response to the temperature difference being greater than the predetermined temperature difference, determine the heating state of the aerosol-forming substrate in the atomization assembly 10 to be uncompleted heating; and in response to the temperature difference being not greater than the predetermined temperature difference, i.e., in response to the temperature difference being less than or equal to the predetermined temperature difference, determine the heating state of the aerosol-forming substrate in the atomization assembly 10 to be completed heating.

In a specific embodiment, when the heating state is determined to be completed heating, the controller is further configured to output a control signal. The control signal includes at least a power-off signal to disconnect an electrical connection of the atomization assembly 10, for terminating the heating process. Of course, in other embodiments, the control signal may further include a prompt signal to remind the user that an active ingredient in the current aerosol forming substrate has currently been baked completely, such that the user can make corresponding actions in time, for example, to stop inhaling in time to prevent inhaling a burnt smell. The prompt signal may be one or more of an acoustic-and-optical prompt, a vibration prompt and a voice prompt.

The controller is further configured to control a heating mode according to the heating state of the aerosol-forming substrate in the atomization assembly to control the heating mode to a non-heating mode in response to the heating state being completed heating. Specifically, the controller may be a processor.

Specifically, when the heating state of the aerosol-forming substrate in the atomization assembly 10 is completed heating, the controller is further configured to control the current heating mode to the non-heating mode according to the control signal; and when the heating state of the aerosol-forming substrate in the atomization assembly 10 is uncompleted heating, the controller is further configured to obtain a difference between the temperature difference and the predetermined temperature difference, determine a theoretical electric power value of the atomization assembly 10 according to the difference, and adjust a current electric power value of the atomization assembly 10 according to the theoretical electric power value. Each difference corresponds to a theoretical electrical power value.

Further, in a specific embodiment, after determining that the heating state of the aerosol forming substrate in the atomization assembly 10 is uncompleted heating, the controller is further configured to determine the number of remaining inhaling times of the atomization assembly 10 according to the difference. Each difference corresponds to a number value of remaining inhaling times of the atomization assembly 10.

In the atomization assembly 10 provided in the embodiment, a first temperature collector 12 is arranged at a position of the atomization chamber 11 corresponding to an outlet 113 to collect a first temperature at the position by the first temperature collector 12; a controller is arranged to be connected to the first temperature collector 12 to compare a temperature difference between the first temperature and a second temperature with a predetermined temperature difference to determine the heating state of the aerosol-forming substrate in the atomization assembly 10; the heating mode of the aerosol-forming substrate in the atomization assembly 10 is controlled according to the determined heating state of the aerosol-forming substrate in the atomization assembly 10 to control the heating mode to a non-heating mode when the heating state is completed heating, so as to terminate the heating of the aerosol-forming substrate in the atomization assembly 10. Compared with the prior art in which the heating is terminated based on a determination of the user's taste, in the present disclosure, the heating can be terminated in time after the aerosol-forming substrate is baked, thereby preventing the problem of the user continuing to inhale and inhaling a burnt smell after the aerosol forming substrate is completely baked, and ensuring that the user inhales a sufficient amount of smoke each time to improve the user experience. Moreover, the first temperature collector 12 collects the temperature at the position of the outlet 113 of the atomization assembly 10, and the second temperature is a temperature at a position other than the outlet 113 of the atomization assembly 10. By comparing the temperature at the position of the outlet 113 of the atomization assembly 10 with the temperature at the other position, the heating state of the aerosol-forming substrate in the atomization assembly 10 may be determined, such that the accuracy of determining the heating state of the aerosol-forming substrate in the atomization assembly 10 can be greatly improved.

Figure 5:
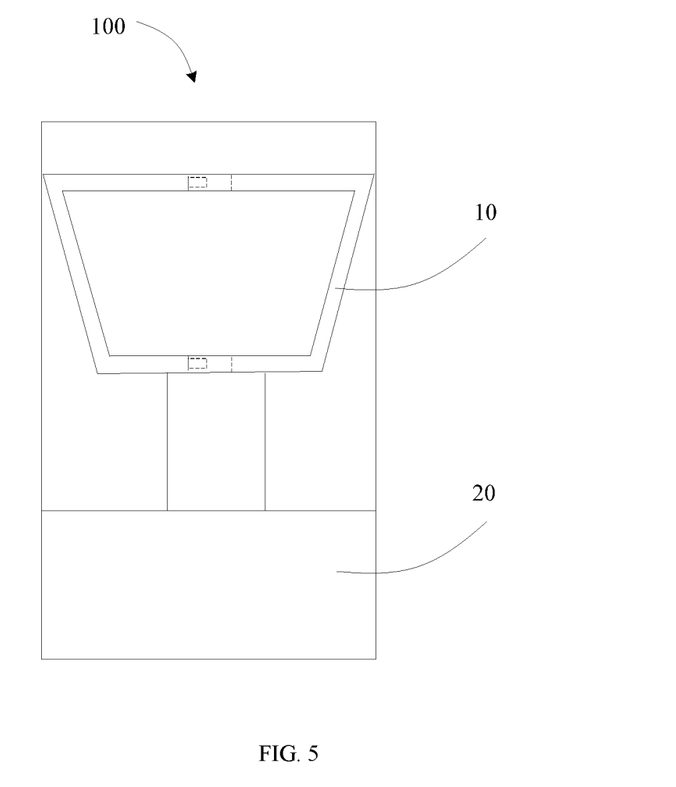
FIG. 5 is a structural schematic view of an electronic atomization device according to an embodiment of the present disclosure.

FIG. 5 is a structural schematic view of an electronic atomization device according to an embodiment of the present disclosure. In the embodiment, an electronic atomization device 100 is provided, which may be configured to heat and atomize an aerosol-forming substrate for generating smoke to be inhaled by a user. The electronic atomization device 100 may be specifically an electronic cigarette and the aerosol-forming substrate may be specifically tobacco.

Specifically, the electronic atomization device 100 includes an atomization assembly 10 and a power supply assembly 20.

The atomization assembly 10 is configured to heat and atomize an aerosol-forming substrate housed therein when energized, the specific structure and function of which can be found in the relevant description above, and will not be repeated here. The power supply assembly 20 is connected to the atomization assembly 10 for supplying power to the atomization assembly 10. Specifically, the power supply assembly 20 may be a rechargeable lithium-ion battery.

In the electronic atomization device arranged with an atomization assembly 10 provided in the embodiment, a first temperature collector 12 is arranged at a position of the atomization chamber 11 corresponding to an outlet 113 to collect a first temperature at the position by the first temperature collector 12; a controller is arranged to be connected to the first temperature collector 12 to compare a temperature difference between the first temperature and a second temperature with a predetermined temperature difference to determine the heating state of the aerosol-forming substrate in the atomization assembly 10; the heating mode of the aerosol-forming substrate in the atomization assembly 10 is controlled according to the determined heating state of the aerosol-forming substrate in the atomization assembly 10 to control the heating mode to a non-heating mode when the heating state is completed heating, so as to terminate the heating of the aerosol-forming substrate in the atomization assembly 10. Compared with the prior art in which the heating is terminated based on a determination of the user's taste, in the present disclosure, the heating can be terminated in time after the aerosol-forming substrate is baked, thereby preventing the problem of the user continuing to inhale and inhaling a burnt smell after the aerosol forming substrate is completely baked, and ensuring that the user inhales a sufficient amount of smoke each time to improve the user experience. Moreover, the first temperature collector 12 collects the temperature at the position of the outlet 113 of the atomization assembly 10, and the second temperature is a temperature at a position other than the outlet 113 of the atomization assembly 10. By comparing the temperature at the position of the outlet 113 of the atomization assembly 10 with the temperature at the other position, the heating state of the aerosol-forming substrate in the atomization assembly 10 may be determined, such that the accuracy of determining the heating state of the aerosol-forming substrate in the atomization assembly 10 can be greatly improved.

The above is only an embodiment of the present disclosure and is not intended to limit the scope of the present disclosure. Any equivalent structure or process transformation using the contents of the specification and the accompanying drawings of the present disclosure, or any direct or indirect application in other related technical fields, is equally included in the scope of the present disclosure.

What is claimed is:

1. A method for controlling a heating mode of an atomization assembly, comprising:

obtaining a first temperature at a first predetermined position of the atomization assembly via a first temperature collector; wherein the first predetermined position is a position around an outlet of the atomization assembly;

obtaining a temperature difference between the first temperature and a second temperature via a controller; wherein the second temperature is a temperature at a second predetermined position of the atomization assembly;

comparing the temperature difference with a predetermined temperature difference and obtaining a comparison result, and determining a consumption state of an aerosol-forming substrate in the atomization assembly according to the comparison result; wherein the heating mode comprises completed atomization and uncompleted atomization; and controlling the heating mode according to the consumption state of the aerosol-forming substrate in the atomization assembly by changing the heating mode to a non-heating mode in response to the consumption state being the completed atomization.

2. The method according to claim 1, before the obtaining the temperature difference between the first temperature and the second temperature via the controller, further comprising:

obtaining the second temperature at the second predetermined position of the atomization assembly via a second temperature collector; wherein the second temperature collector is arranged at the second predetermined position of the atomization assembly, and the second predetermined position is different from the first predetermined position.

3. The method according to claim 1, before the obtaining the temperature difference between the first temperature and the second temperature via the controller, further comprising:

obtaining a specific heat capacity, a mass, and current heat data of the atomization assembly via the controller; and obtaining the second temperature according to the specific heat capacity, the mass, and the current heat data of the atomization assembly.

4. The method according to claim 1, wherein the determining the consumption state of the aerosol-forming substrate in the atomization assembly according to the comparison result comprises:

in response to the temperature difference being greater than the predetermined temperature difference, determining the consumption state of the aerosol-forming substrate in the atomization assembly to be the uncompleted atomization; and in response to the temperature difference being less than or equal to the predetermined temperature difference, determining the consumption state of the aerosol-forming substrate in the atomization assembly to be the completed atomization, and outputting a control signal; wherein the control signal comprises at least one of a power-off signal and a prompt signal to remind a user.

5. The method according to claim 4, wherein the controlling the heating mode according to the consumption state of the aerosol-forming substrate in the atomization assembly by changing the heating mode to the non-heating mode in response to the consumption state being the completed atomization comprises:

in response to the consumption state of the aerosol-forming substrate in the atomization assembly being the completed atomization, changing the heating mode to be the non-heating mode according to the control signal;

in response to the consumption state of the aerosol-forming substrate in the atomization assembly being the uncompleted atomization, obtaining a different between the temperature difference and the predetermined temperature difference;

determining a theoretical electric power value of the atomization assembly according to the difference; and adjusting a current electric power value of the atomization assembly according to the theoretical electric power value; wherein the difference and the theoretical electric power value have a one-to-one correspondence relationship.

6. The method according to claim 5, after the obtaining the different between the temperature difference and the predetermined temperature difference in response to the consumption state of the aerosol-forming substrate in the atomization assembly being the uncompleted atomization, further comprising:

determining the number of remaining inhaling times of the atomization assembly according to the difference; wherein the difference and the number of remaining inhaling times have a one-to-one correspondence relationship.

7. The method according to claim 1, wherein the second predetermined position is a position close to a heating element of the atomization assembly.

8. An atomization assembly, comprising:

an atomization chamber, defining an inlet and an outlet and configured to accommodate an aerosol-forming substrate;

a heat generating element, configured to heat and atomize the aerosol-forming substrate when the heat generating element is energized;

a first temperature collector, arranged at a first predetermined position of the atomization chamber, and configured to obtain a first temperature at the first predetermined position of the atomization chamber; wherein the first predetermined position is a position around the outlet of the atomization chamber; and a controller, connected to the first temperature collector and configured to:

obtain a temperature difference between the first temperature and a second temperature;

compare the temperature difference with a predetermined temperature difference and obtaining a comparison result, and determine a consumption state of an aerosol-forming substrate in the atomization assembly according to the comparison result; wherein the second temperature is a temperature at a second predetermined position of the atomization chamber, and the consumption state comprises completed atomization and uncompleted atomization; and control the heating mode according to the consumption state of the aerosol-forming substrate in the atomization assembly by changing the heating mode to a non-heating mode in response to the consumption state being the completed atomization.

9. The atomization assembly according to claim 8, further comprising a second temperature collector connected to the controller; wherein the second temperature collector is arranged at the second predetermined position of the atomization chamber; the second temperature collector is configured to obtain the second temperature and send the second temperature to the controller; the second predetermined position is different from the first predetermined position.

10. The atomization assembly according to claim 8, wherein the controller is further configured to obtain a specific heat capacity, a mass, and current heat data of the atomization assembly via the controller; and obtain the second temperature according to the specific heat capacity, the mass, and the current heat data of the atomization assembly.

11. The atomization assembly according to claim 8, wherein the controller is further configured to:
in response to the temperature difference being greater than the predetermined temperature difference, determine the consumption state of the aerosol-forming substrate in the atomization assembly to be the uncompleted atomization; and
in response to the temperature difference being less than or equal to the predetermined temperature difference, determine the consumption state of the aerosol-forming substrate in the atomization assembly to be the completed atomization, and output a control signal; wherein the control signal comprises at least one of a power-off signal and a prompt signal to remind a user.

12. The atomization assembly according to claim 11, wherein the controller is further configured to:
in response to the consumption state of the aerosol-forming substrate in the atomization assembly being the completed atomization, change the heating mode to be the non-heating mode according to the control signal;
in response to the consumption state of the aerosol-forming substrate in the atomization assembly being the uncompleted atomization, obtain a different between the temperature difference and the predetermined temperature difference;
determine a theoretical electric power value of the atomization assembly according to the difference; and
adjust a current electric power value of the atomization assembly according to the theoretical electric power value; wherein the difference and the theoretical electric power value have a one-to-one correspondence relationship.

13. The atomization assembly according to claim 12, wherein the controller is further configured to determine the number of remaining inhaling times of the atomization assembly according to the difference; wherein the difference and the number of remaining inhaling times have a one-to-one correspondence relationship.

14. The atomization assembly according to claim 8, wherein the second predetermined position is a position close to a heating element of the atomization assembly.

15. An electronic atomization device, comprising:
an atomization assembly; and
a power supply assembly, connected to the atomization assembly and configured to supply power to the atomization assembly;
wherein the atomization assembly comprises:
an atomization chamber, defining an inlet and an outlet and configured to accommodate an aerosol-forming substrate;
a heat generating element, configured to heat and atomize the aerosol-forming substrate when the heat generating element is energized;
a first temperature collector, arranged at a first predetermined position of the atomization chamber, and configured to obtain a first temperature at the first predetermined position of the atomization chamber; wherein the first predetermined position is a position around the outlet of the atomization chamber; and
a controller, connected to the first temperature collector and configured to:
obtain a temperature difference between the first temperature and a second temperature;
compare the temperature difference with a predetermined temperature difference and obtaining a comparison result, and determine a consumption state of an aerosol-forming substrate in the atomization assembly according to the comparison result; wherein the second temperature is a temperature at a second predetermined position of the atomization chamber, and the consumption state comprises completed atomization and uncompleted atomization; and
control the heating mode according to the consumption state of the aerosol-forming substrate in the atomization assembly by changing the heating mode to a non-heating mode in response to the consumption state being the completed atomization.

16. The electronic atomization device according to claim 15, wherein the atomization assembly further comprises a second temperature collector connected to the controller; the second temperature collector is arranged at the second predetermined position of the atomization chamber; the second temperature collector is configured to obtain the second temperature and send the second temperature to the controller; the second predetermined position is different from the first predetermined position.

17. The electronic atomization device according to claim 15, wherein the controller is further configured to obtain a specific heat capacity, a mass, and current heat data of the atomization assembly via the controller; and obtain the second temperature according to the specific heat capacity, the mass, and the current heat data of the atomization assembly.

18. The electronic atomization device according to claim 15, wherein the controller is further configured to:
in response to the temperature difference being greater than the predetermined temperature difference, determine the consumption state of the aerosol-forming substrate in the atomization assembly to be the uncompleted atomization; and
in response to the temperature difference being less than or equal to the predetermined temperature difference, determine the consumption state of the aerosol-forming substrate in the atomization assembly to be the completed atomization, and output a control signal; wherein the control signal comprises at least one of a power-off signal and a prompt signal to remind a user.

19. The electronic atomization device according to claim 18, wherein the controller is further configured to:
in response to the consumption state of the aerosol-forming substrate in the atomization assembly being the completed atomization, control the heating mode to be the non-heating mode according to the control signal;
in response to the consumption state of the aerosol-forming substrate in the atomization assembly being the uncompleted atomization, obtain a different between the temperature difference and the predetermined temperature difference;
determine a theoretical electric power value of the atomization assembly according to the difference; and
adjust a current electric power value of the atomization assembly according to the theoretical electric power value; wherein the difference and the theoretical electric power value have a one-to-one correspondence relationship.

20. The electronic atomization device according to claim 19, wherein the controller is further configured to determine the number of remaining inhaling times of the atomization assembly according to the difference; wherein the difference and the number of remaining inhaling times have a one-to-one correspondence relationship.

* * * * *